(12) United States Patent
Quardt et al.

(10) Patent No.: US 6,733,344 B2
(45) Date of Patent: May 11, 2004

(54) ELECTRONIC DEVICE HOUSING

(75) Inventors: Dirk Quardt, Iserlohn (DE); Jörg Söfker, Lemgo (DE); Reinhard Gottlieb Starzinger, Schörfling (AT); Hans Peter Wintersteiger, Hagenberg (AT)

(73) Assignee: Phoenix Contact GmbH & Co. KG, Blomberg (DE)

( * ) Notice: Subject to any disclaimer, the term of this patent is extended or adjusted under 35 U.S.C. 154(b) by 101 days.

(21) Appl. No.: 09/994,918

(22) Filed: Nov. 28, 2001

(65) Prior Publication Data

US 2002/0093794 A1 Jul. 18, 2002

(51) Int. Cl.$^7$ .............................. H02B 1/052; H01R 9/26
(52) U.S. Cl. .................... 439/716; 361/802; 248/694; 248/228.3; 248/231.41
(58) Field of Search .................. 248/694, 214, 248/215, 228.3, 228.6, 228.7, 231.41, 231.71, 231.81, 227.4, 229.12, 229.15, 229.16; 439/716, 717; 361/730, 732, 734, 727, 801, 802

(56) References Cited

FOREIGN PATENT DOCUMENTS

| DE | 79 16 477 U1 | | 1/1981 |
|---|---|---|---|
| DE | 3526494 A1 | * | 1/1987 |
| DE | 3732434 A1 | * | 6/1989 |
| DE | 41 17 465 A1 | | 12/1991 |
| DE | 42 10 556 C2 | | 10/1993 |
| DE | 296 12 121 U1 | | 9/1996 |
| DE | 197 24 945 A1 | | 12/1998 |
| DE | WO-99/56364 A1 | * | 4/1999 |
| EP | 0437124 A1 | * | 7/1991 |
| FR | 2551807 A1 | * | 3/1985 |
| GB | 2056179 A | * | 3/1981 |
| GB | 2254189 A | * | 9/1992 |
| GB | 2346018 A | * | 7/2000 |
| JP | 50-42374 | * | 4/1975 |

OTHER PUBLICATIONS

U.S. Patent Application Publication No. US 2001/0051466, filed Dec. 19, 2000, published Dec. 13, 2001, inventor: Bechaz et al.*
"Phoenix Contact, Innovation in Interface—Catalogue 10 Elektronikgehäuse" 98/99, pp. 46 to 49.

* cited by examiner

Primary Examiner—Ramon O. Ramirez
Assistant Examiner—Jon Szumny
(74) Attorney, Agent, or Firm—Nixon Peabody LLP; David S. Safran

(57) ABSTRACT

A housing for an electronic device which can be removably mounted onto a mounting rail which includes a locking element located in an underside of the housing. The locking element can be moved from a first position in which the housing can be fastened onto the mounting rail into a second position wherein the housing can be lifted off the mounting rail. The locking element is associated with a retaining element for retaining the locking element in the second position. The retaining element includes a spring section extending substantially parallel to the locking element and a retaining section extending substantially perpendicularly thereto.

11 Claims, 4 Drawing Sheets

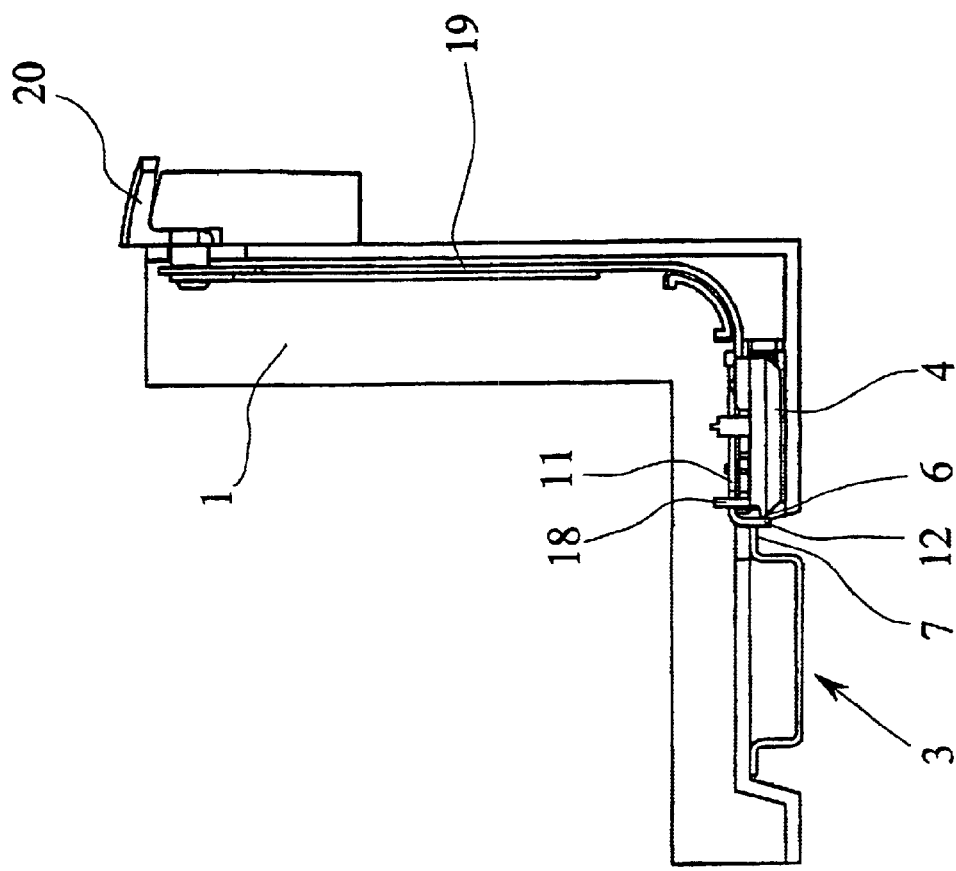
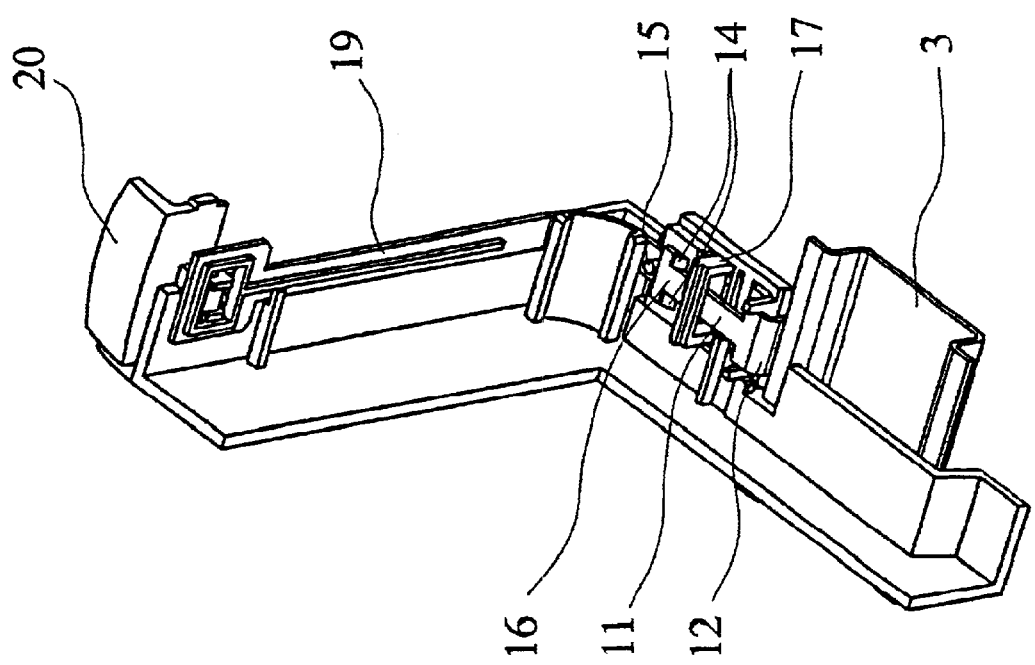

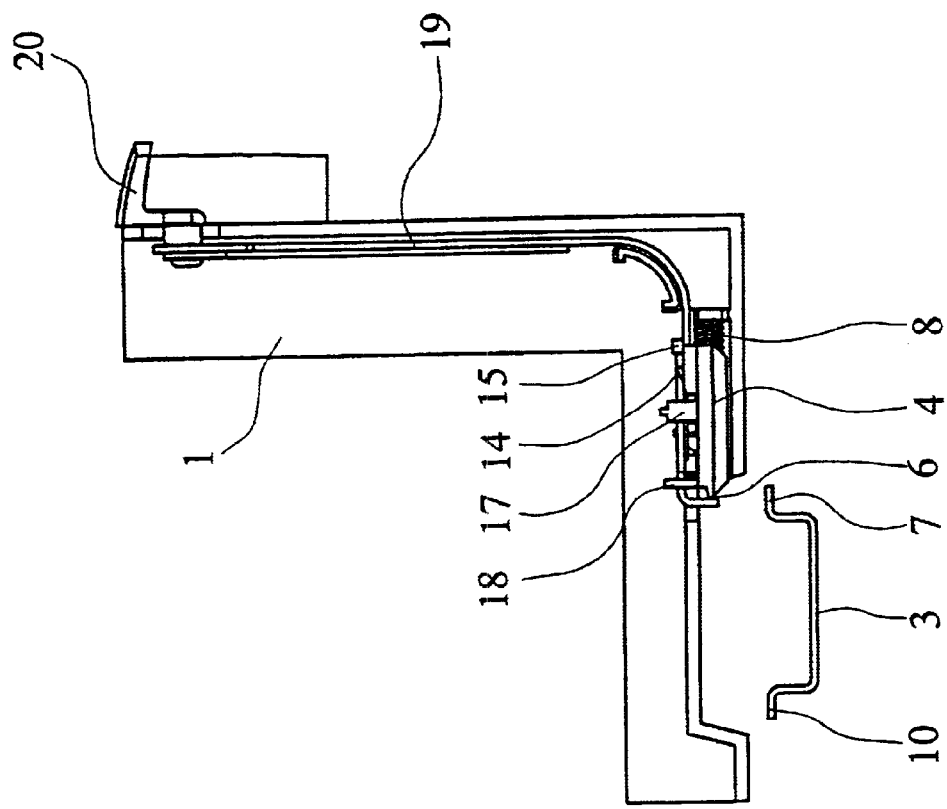
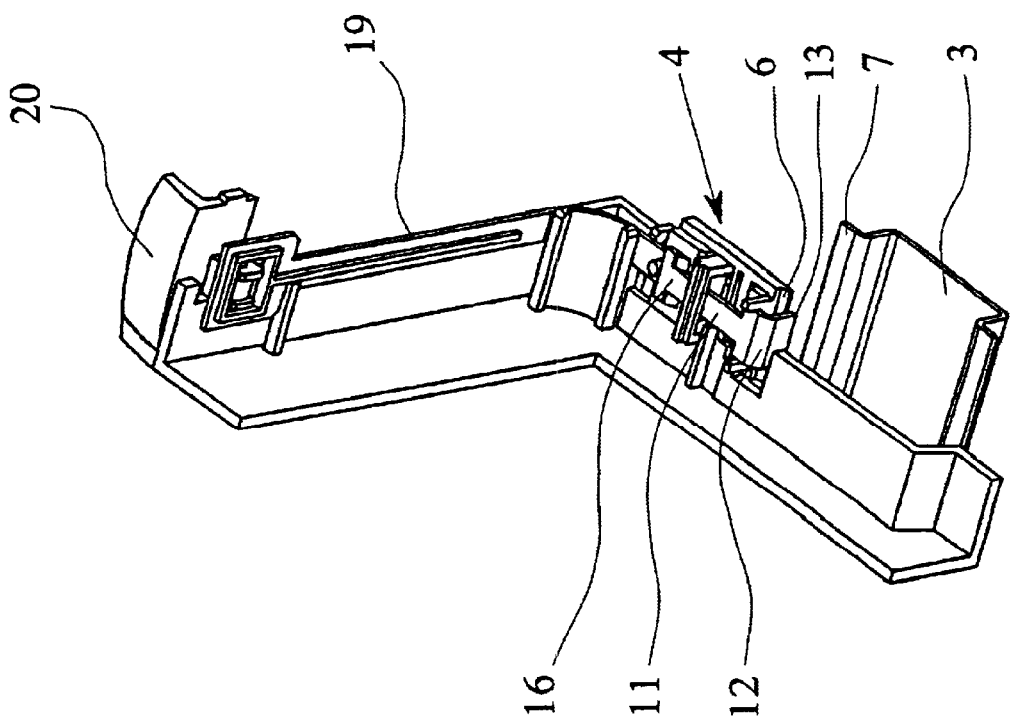

under its spring force, the spring section of the retaining element in the first position is in a deflected position. In this position, the retaining element is not in engagement with the locking element. Thus during the normal operation of the housing, the retaining element does not affect the locking element. This is only the case when the user moves the locking element into the second position, whereby the retaining section is moved into its position in front of the end of the locking element.

ELECTRONIC DEVICE HOUSING

BACKGROUND OF THE INVENTION

1. Technical Field

The invention relates to housings for electronic devices which are removably mounted on a mounting rail with a locking element positioned in the underside of the housing, whereby the locking element can be moved from a first position in which the housing is fastenable onto the rail, into a second position in which the housing can be lifted off the rail, whereby the locking element is associated with a retaining element for fixing it in the second position.

2. Description of Related Art

In view of the trend to decentralization of electronics directly into the process and the miniaturization of electronics components into compact, installation-friendly devices, more and more suitable electronics housings are needed, whereby the connection technology is generally also integrated into the housing. The individual housings are then preferably connected with one another and with a control through a bus system. The overall construction of the housing must thereby be such that a direct mounting of the housing onto the mounting rail is possible.

Depending on the respective application, this then results in a multitude of different housing types which differ in size, construction and function. All these housings are similar in that they contain electronic components, mostly in the form of integrated circuit boards, which are protected by the housing from physical contact and dirt. Such housings are generally of modular construction, whereby the housings are built especially as a kit so that the individual housing components can be quickly and individually assembled into an optimal housing. The housings often consist of a housing top and a housing base, whereby the housing top includes connectors for electrical conductors. The connectors are connected with the housing base through plug-in contacts with the housing base creating the connection to a bus system. The individual housings are thereby constructed to allow several housings to be snapped side by side onto a mounting rail so that several housings together form a housing block. The individual adjacent housings or the individual adjacent electronic apparatus can thereby preferably be electrically contacted with one another.

The fastening of such housings onto the mounting rail is achieved by way of a locking element provided in the housing base, which locking element interlocks with the mounting rail when the housing is placed on the mounting rail. In order to detach the housing, and therefore also the electronic device, from the mounting rail, the locking element, which is typically spring biased, must be retracted against its spring force.

In a known housing ("PHOENIX CONTACT—Catalogue 10 ELEKTRONIKGEHÄUSE" 98/99, pages 46 to 49), the locking element is retracted by insertion of a screw driver tip into an especially provided access opening, so that the locking element releases the mounting rail and the electronic apparatus can be lifted off the mounting rail. It is disadvantageous thereby that the locking element must be maintained in the release position for removal of the housing or electronic device. This is especially difficult when the locking element which is located at the underside of the base is only reachable with difficulty because of space constraints. In that situation the risk exists that the inserted screw driver quickly slides out of the access opening of the locking element which results in the housing locking anew onto the mounting rail. Finally, it is hardly possible with the known housing construction to simultaneously lift several housings off the mounting rail.

A housing as described above is known from Published German Patent application DE 296 12 121, in which the locking element latches in the open position. For that purpose, the locking element, which is shaped as a slider, has two laterally positioned elastic flaps which can interlock with receptacles provided in the housing, when the slider is correspondingly pulled from the locking position into the release position. The construction of the elastic flaps is thereby problematic, since they must also hold the locking element in the closed position. Furthermore, there is the risk of the flaps being damaged or even broken off upon unseating of the locking element from the release position. If damage or breakage occurs, the locking element may then neither be latched in the release position, nor held in the locked position, so that the housing can then no longer be safely held on the mounting rail.

A quick fastening element for electronic devices is known from German Utility Model DE 79 16 477 U1, by which the devices can be snapped onto the mounting rail. The quick fastening element consists of a snap element and a wire yoke which is located in a guide in the housing base. The quick fastening element can be latched in the open position by way of the wire yoke of U-shaped construction with two opposing offsets, and by the construction of the guide with complementary shaped multi-step contours. The construction of the quick fastening element and the construction of the guide in the housing is thereby also relatively costly. Furthermore, before setting the housing onto the mounting rail, the user must again move the quick fastening element out of the release position. A similar fastening element is also known from published German Patent application DE 41 17 465 A1 and German patent DE 42 10 556 C2, whereby the construction of the fastening element and the construction of the guide in the housing is again relatively costly, and the user must again first move the fastening element manually, or with a corresponding tool, out of the release position before setting down the housing.

SUMMARY OF THE INVENTION

It is therefore one object of the present invention to overcome the disadvantages of the prior art described above.

It is yet another object of the present invention to facilitate the detachment of a housing from, and especially its setting down onto, a mounting rail, whereby the locking element is maintainable by the retaining element in the second position, i.e. the open position.

The above objects and other objects are achieved by providing a retaining element having a spring section extending essentially parallel to the locking element and a retaining section extending essentially perpendicular thereto. In the first position, the spring section is deflected against its spring force while it is relaxed in the second position. The retaining section in the first position rests with its lower edge on an edge of the mounting rail and in the second position is positioned essentially perpendicularly in front of one end of the locking element, whereby the locking element is fixed in the second position.

By constructing the retaining element in accordance with the invention, it is especially easy to hold the locking element in the second position. Such a construction of the retaining element guarantees that the latter functions essentially automatically without separate interference by a user being required. For deflection of the retaining element back into the first position, the carrier edge is used to deflected the retaining element and hold it in the deflected position, so that again no separate component is required. The housing is even somewhat additionally fastened to the mounting rail by the lower edge of the retaining section sitting on the edge of the mounting rail, since this means that the edge of the mounting rail is wedged between the lower edge of the retaining section and the end of the locking element.

Once a user has brought the locking element of the housing into the second position, i.e. the release position, a subsequent undesired re-latching of the housing onto the mounting rail is prevented by way of the retaining element. Thus, the user needs to move the locking element only once from the first position into the second position, whereafter the locking element is then maintained in the second position by the retaining element. It is therefore no longer necessary for the user to hold the locking element in the release position during lifting of the housing off the mounting rail it. The user can therefore simply lift the housing off the mounting rail with one hand. This especially provides the further possibility to simultaneously detach several housings and, thus, electronic devices, from the mounting rail.

The locking element is preferably improved by including a latch nose which grips behind an edge of the mounting rail when the locking element is in the first position. This locking element with the latch nose is, on the one hand, easily manufactured, and on the other hand, provides sufficient securing of the housing against unintended detachment. With respect to manufacturing technology, it is further advantageous when the locking element is associated with a spring element by which the locking element is pressed against the edge of the mounting rail when in the first position. On the one hand, such a spring element can be easily manufactured and on the other hand, exchange of a defective spring element is possible without exchange of the complete locking element.

It is further advantageous to construct the retaining element as a resilient metal part, whereby the retaining element can be easily produced, for example, by stamping. Furthermore, the chance of the retaining element being damaged is relatively low, since the metal part is much more robust than the flaps known from the prior art. However, should the retaining element be damaged, it can be easily replaced without exchange of the complete locking element.

According to a further preferred embodiment of the housing in accordance with the present invention, the locking element can be operated by way of an auxiliary actuator, as generally known from DE 197 24 945, whereby the auxiliary actuator is mechanically connected with the locking element. Operation of the locking element thereby means that the locking element is moved from the first position, in which the housing is fastened to the mounting rail, to the second position in which the housing can be lifted off the mounting rail. The operation of the locking element is facilitated for the user by provision of the auxiliary actuator, which preferably includes a grip portion on that end which is directed away from the locking element. Since it is necessary for functional reasons to position the locking element in the underside of the housing, it is generally accessible to the user only with relative difficulty. By providing the auxiliary actuator, it is now possible for the user to operate the locking element from a more easily accessible location, through the auxiliary actuator, for example, in the vicinity of the housing top surface.

BRIEF DESCRIPTION OF THE DRAWINGS

FIG. 1b is a side view of the embodiment of FIG. 1a;

FIG. 2a is an isometric view of the embodiment of FIG. 1, wherein the housing is still mounted on the mounting rail, but no longer locked thereto;

FIG. 2b is a side view of the housing in the position shown in FIG. 2a;

FIGS. 3a and 3b is an isometric view of the embodiment of the housing shown in the previous Figs., but detached from the mounting rail.

DETAILED DESCRIPTION OF THE PREFERRED EMBODIMENT

Figure 1B:
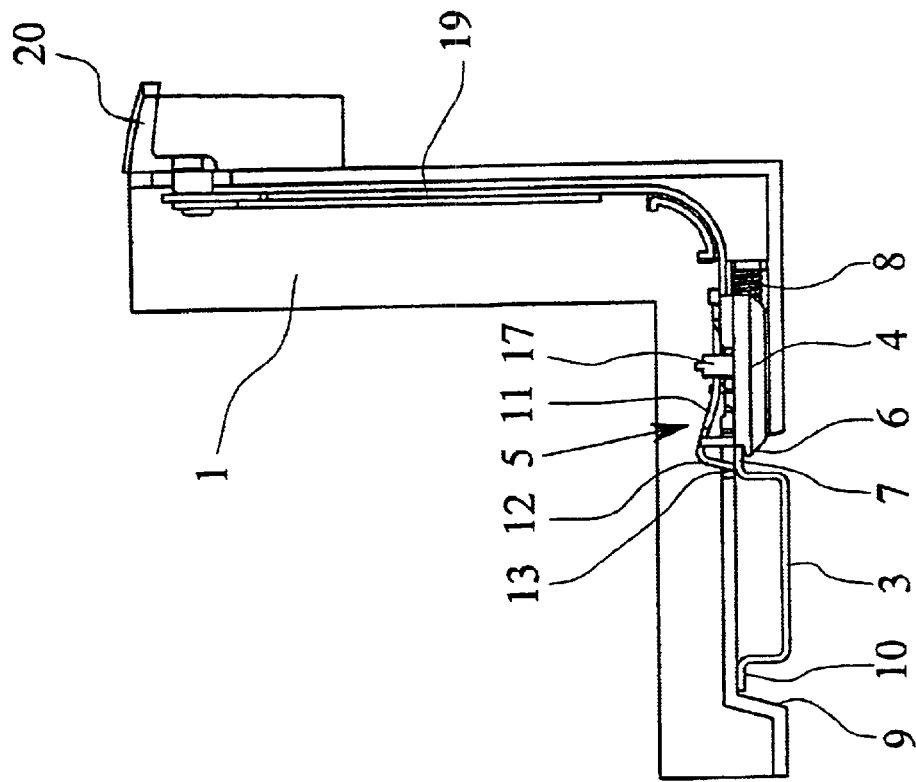
Figure 1A:
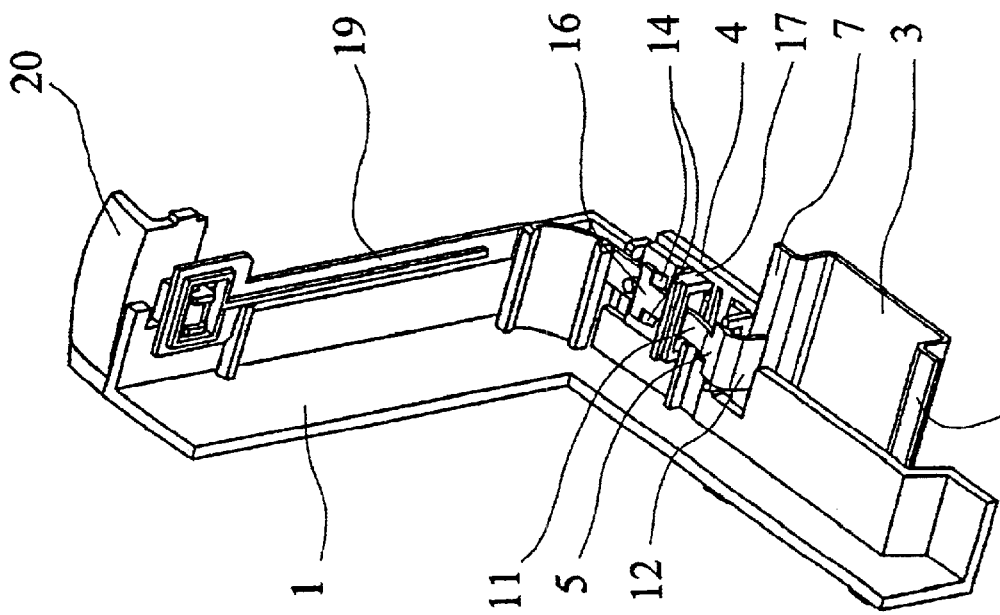
FIG. 1a is an isometric view of part of a housing in accordance with the present invention, whereby the housing is fastened to a mounting rail with the locking element being in the first, locked position.

FIGS. 1a–4 show a portion of an electronic device housing in accordance with an exemplary embodiment of the present invention including at least two lateral housing parts 1, 2. The housing also includes a locking mechanism in accordance with the present invention. The electronics of an electronic device are inserted into the housing, for example, in the form of an integrated circuit board (not illustrated). Apart from the housing illustrated in the Figs. which has two lateral housing parts 1, 2, the housing can also consist of several other housing parts or, for example, of a housing top part and a housing base part, whereby generally the housing top part includes contacts for electrical conductors.

The housing is removably mountable on a mounting rail 3, for which a locking element 4 is positioned in the housing base. The locking element 4 is thereby movable in the housing in such a way that it can be moved from a first position (FIGS. 1a and 1b) in which the housing is fastened to the mounting rail 3 to a second position (FIGS. 2a and 2b) in which the housing can be lifted off the mounting rail 3. The locking element 4 is thereby held in the first position by a spring element, so that the locking element 4 can be moved from the first position to the second position by application of a retracting force solely counteracting the spring force of the spring element. If this retracting force is not continuously maintained, the locking element 4 snaps back into the first position and the housing is again locked on the mounting rail 3.

A retaining element 5 is associated with the locking element 4 for holding the locking element 4 in the second position. The retaining element 5 thereby provides that the locking element 4, once moved into the second or open position, will not snap back to its first position, the locked position, which would result in the housing being once again locked on the mounting rail 3.

A latch nose 6 is formed on one end face of the locking element 4 for the locking the housing on the mounting rail 3. This is achieved by the latch nose gripping behind an edge 7 of the mounting rail 3 in the first position of the locking element 4. The locking element 4 is pushed against the mounting rail 3 by the spring force of a spring 8 which on the one hand is supported in the housing and on the other hand engages the opposite, second end face of the locking element 4. The latch nose 6 grips behind the edge 7 of the mounting rail 3 so that a lifting of the housing off the mounting rail 3 is prevented. For detachment of the housing from the mounting rail 3, the locking element 4 must now be retracted away from the mounting rail 3 against the spring force of the spring 8 so that the latch nose 6 releases the edge 7 of the mounting rail 3.

In order to prevent an undesired detachment of the housing from the mounting rail 3 by tipping of the housing, a recess is preferably provided in a side 9 of the housing base which is generally opposite the locking element 4 which recess is engaged by the second edge 10 of the mounting rail 3.

When the locking element 4 is pulled back against the spring force of the spring 8, the latch nose 6 releases the edge 7 of the mounting rail 3 and the housing can be lifted off the mounting rail 3. However, it is a prerequisite that the locking element 4 be reliably maintained in the second, open position so that the locking element 4 remains pulled back against the spring force of the spring 8. Due to the retaining element 5 in accordance with the invention, it is now no longer necessary for a user to reliably hold the locking element 4 in the retracted position, since the locking element 4, after a single, quick pull-back of the locking element 4, is held by the retaining element 5 in the second position illustrated in FIGS. 2a and 2b.

In the exemplary embodiment, the retaining element 5 is constructed as a resilient metal member having a spring portion 11 extending essentially parallel to the locking element 4 and a retaining portion 12 extending essentially perpendicular thereto. When the housing is snapped onto the mounting rail 3, the locking element 4 is thus in the first position, the lower edge 13 of the retaining portion 12 rests on the edge 7 of the mounting rail 3, whereby the spring portion 11 of the retaining element 5 is deflected against its spring force. Thus when mounted on the rail in the first position, the retaining portion 12 is not positioned in front of the latch nose 6 of the locking element 4, which would prevent gripping of the latch nose 6 behind the edge 7 of the mounting rail 3. The housing is even additionally fastened to the mounting rail 3 by the lower edge 13 of the retaining portion 12 resting on the edge 7 of the mounting rail 3, since the edge 7 of the mounting rail 3 is wedged between the lower edge 13 of the retaining portion 12 and the latch nose 6 of the locking element 4.

If the housing is now to be detached from the mounting rail 3 (FIGS. 2a and 2b), the locking element 4 must be pulled back against the spring force of the spring 8. The retaining element 5 fastened on the locking element 4 is thereby also pulled back so that the spring portion 11 snaps from its initially deflected position back into the relaxed position as soon as the lower edge 13 of the retaining portion 12 has reached the end of the edge 7 of the mounting rail 3. When the spring portion 11 of the retaining element 5 is in its relaxed position, i.e. when the spring portion 11 extends parallel to the locking element 4, the retaining portion 12 is positioned perpendicularly in front of the latch nose 6 of the locking element 4, so that the locking element 4 can no longer be pushed back into the locking position by the spring force of spring 8. The single pull-back of the locking element 4 by the user simultaneously operates the retaining element 5, since the spring portion 11 snaps back into its relaxed position because of its inherent resiliency as soon as the lower edge 13 of the retaining portion 12 no longer sits on the edge 7 of the mounting rail 3. Thus, in the position illustrated in FIGS. 2a and 2b, the locking element 4 is fixed in the second, open position so that the housing can be lifted off the mounting rail without the user having to further pull back the locking element 4.

Once the housing is lifted off the mounting rail 3 (FIGS. 3a and 3b), the retaining element 5 remains in its relaxed position so that the retaining portion 12 is located transversely and vertically in front of the latch nose 6 of the locking element 4. In order to snap the housing back onto the mounting rail 3, the housing need only be set vertically downwardly onto the mounting rail 3 from the position illustrated in FIGS. 3a and 3b, since the edge 7 of the mounting rail 3 will then deflect the retaining element 5, thereby freeing the locking element 4. Furthermore, because of the oblique lower edge of the latch nose 6, the locking element 4 is automatically moved rearward against the spring force of the spring 8, until the lower edge 13 of the retaining portion 12 comes to sit on the edge 7 of the mounting rail 3. If the housing is further pushed downwardly, the retaining portion 12 is pushed upwardly into the housing so that the latch nose 6 of the locking element 4 is released and, due to the spring force of the spring 8, again grips behind the edge 7 of the mounting rail 3. The spring portion 11 is thereby deflected against its spring force so that the position illustrated in FIGS. 1a and 1b is reached again.

Figure 4:
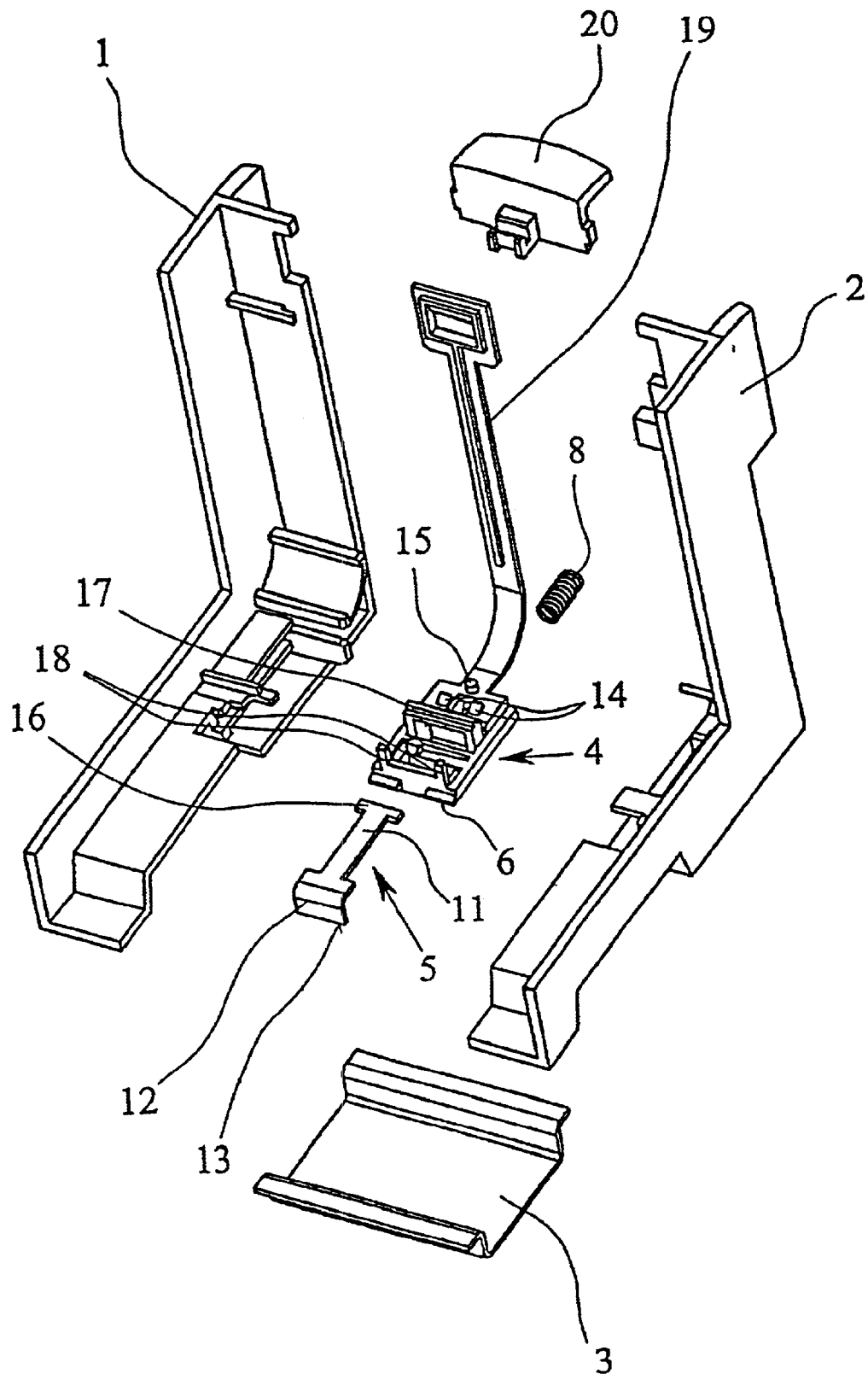
FIG. 4 is an exploded view of the embodiment shown in FIGS. 1a–3b.

It is apparent, especially from FIG. 4, that the retaining element 5 is constructed as a separate part so that the retaining element 5 can be easily manufactured, for example, by stamping. The retaining element 5 is then fastened onto the locking element 4 in that the locking element 4 has two latch hooks 14 and a stop element 15 opposite the latch hooks 14, between which the T-shaped end 16 of the retaining element 5 is wedged. In order to limit the vertical displacement of the retaining element 5, and to prevent an undesired detachment of the retaining element 5 from the locking element 4, an archway-shaped limiting element 17 is formed on the locking element 4 which bridges the spring portion 11 of the retaining element 5. Furthermore, a sideways detachment of the retaining element 5 is prevented by guide webs 18 formed on the locking element 4. On the other hand, the retaining element 5 can also be detached again from the locking element 4 in that the T-shaped end 16 of the retaining element 5 is pried from the latch hooks 14, for example, with a screw driver.

In the embodiment of the housing in accordance with the invention as illustrated in FIGS. 1a to 4, the operation of the locking element 4 is especially easy in that the locking element is connected with an auxiliary actuator 19 which has a gripping portion 20 at an end of the housing directed away from the locking element 4. The auxiliary actuator 19 is thereby constructed as a shallow web which is directed along the housing contour so that the gripping portion 20 fastened to the end of the auxiliary actuator 19 by a snap connection can be easily operated by a user from the front of the housing.

We claim:

1. A housing for an electronic device for removable mounting onto a mounting rail having an edge, the housing comprising:

a locking element for locking the housing onto the mounting rail, said locking element positioned at an underside of the housing, the locking element being movable from a first position wherein the housing is locked onto the mounting rail to a second position wherein the housing can be lifted off the mounting rail; and a retaining element for selectively maintaining the locking element in the second position, said retaining element including a spring section extending substantially parallel to the locking element and a retaining section extending substantially perpendicularly to the locking element, said spring section being deflected against an inherent spring force when said locking element is in the first position and relaxed when said locking element is in the second position, a lower edge of the retaining section resting on the edge of the mounting rail when the locking element is in the first position, said retaining section being positioned substantially perpendicular to the locking element and in front of one end of the locking element when the locking element is in the second position, whereby the locking element is fixed in the second position.

2. The housing of claim 1, further including a latch nose formed at one end of the locking element for gripping behind the edge of the mounting rail in the first position.

3. The housing of claim 2, further including a spring element for forcing the locking element in the first position against the edge of the mounting rail.

4. The housing of claim 1, wherein the retaining element is constructed as a resilient metal part.

5. The housing of claim 4, wherein the retaining element is fastened to the locking element for permitting a deflection of the spring section perpendicular to a longitudinal axis thereof.

6. The housing of claim 1, wherein the retaining element is fastened to the locking element for permitting a deflection of the spring section perpendicular to a longitudinal axis thereof.

7. The housing of claim 6, further comprising a limiting element on the locking element for limiting the deflection of the retaining element.

8. The housing of claim 7, further comprising an auxiliary actuator for operating the locking element, the actuator being mechanically linked to the locking element.

9. The housing of claim 1, further comprising an auxiliary actuator for operating the locking element, the actuator being mechanically linked to the locking element.

10. The housing of claim 9, wherein the actuator includes a gripping portion on an end of the housing directed away from the locking element.

11. The housing of claim 1, wherein the locking element includes a recess for receiving an operating member at an end directed away from the mounting rail.

* * * * *